United States Patent
Hake et al.

(10) Patent No.: US 7,325,623 B2
(45) Date of Patent: Feb. 5, 2008

(54) ROLLING SPIKE HARROW

(75) Inventors: Rodney D. Hake, Tipton, KS (US); Mark R. Underwood, Burr Oak, KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 335 days.

(21) Appl. No.: 11/057,533

(22) Filed: Feb. 14, 2005

(65) Prior Publication Data

US 2006/0180324 A1   Aug. 17, 2006

(51) Int. Cl.
    *A01B 5/00* (2006.01)
(52) U.S. Cl. .................. 172/158; 172/160; 172/549; 172/576
(58) Field of Classification Search ............... 172/133, 172/144, 155, 158, 160, 165, 166, 184, 185, 172/186, 518, 540, 548, 549, 556, 575, 576, 172/579, 581, 599, 604, 21, 22
See application file for complete search history.

(56) References Cited

U.S. PATENT DOCUMENTS

| | | | | |
|---|---|---|---|---|
| 106,118 A | * | 8/1870 | Bussell | 172/184 |
| 1,060,280 A | * | 4/1913 | Olson | 172/593 |
| 1,266,328 A | * | 5/1918 | Schulte | 172/599 |
| 1,455,729 A | * | 5/1923 | Ingman | 172/241 |
| 1,539,097 A | * | 5/1925 | Peterson | 172/158 |
| 2,958,383 A | * | 11/1960 | Danielson | 172/456 |
| 3,173,498 A | * | 3/1965 | Heilbrun | 172/540 |
| 3,306,371 A | * | 2/1967 | Bush | 172/540 |
| 4,607,706 A | * | 8/1986 | Raynor | 172/599 |
| 5,000,270 A | | 3/1991 | Phillips | |
| 5,355,963 A | * | 10/1994 | Boyko et al. | 172/383 |
| 5,794,712 A | | 8/1998 | Phillips | |
| 6,484,812 B1 | | 11/2002 | Clark | |

* cited by examiner

*Primary Examiner*—Thomas B. Will
*Assistant Examiner*—Joel F Mitchell
(74) *Attorney, Agent, or Firm*—Hovey Williams LLP

(57) ABSTRACT

The spike wheels of the harrow are arranged in gangs to rotate about a common axis during ground engagement. Each wheel has a plurality of spikes that project outwardly from a cylindrical hub having a pair of opposite ends. Projections at one end of the hub are matingly received within notches in the opposite end of the hub of the next adjacent wheel so that the wheels are interlocked for rotation in unison. The projections on each hub are offset angularly from the notches by a certain amount so that adjacent wheels are correspondingly rotatively offset from one another. The outermost tips of the spikes of each wheel are inturned to a certain extent so as to render each wheel generally concavo-convex, with the concave sides of the wheels leading as the machine is pulled through the field. Front gangs of the wheels are disposed in a certain oblique attitude with respect to the path of travel of the machine, while rear gangs are disposed in opposite oblique attitudes.

7 Claims, 4 Drawing Sheets

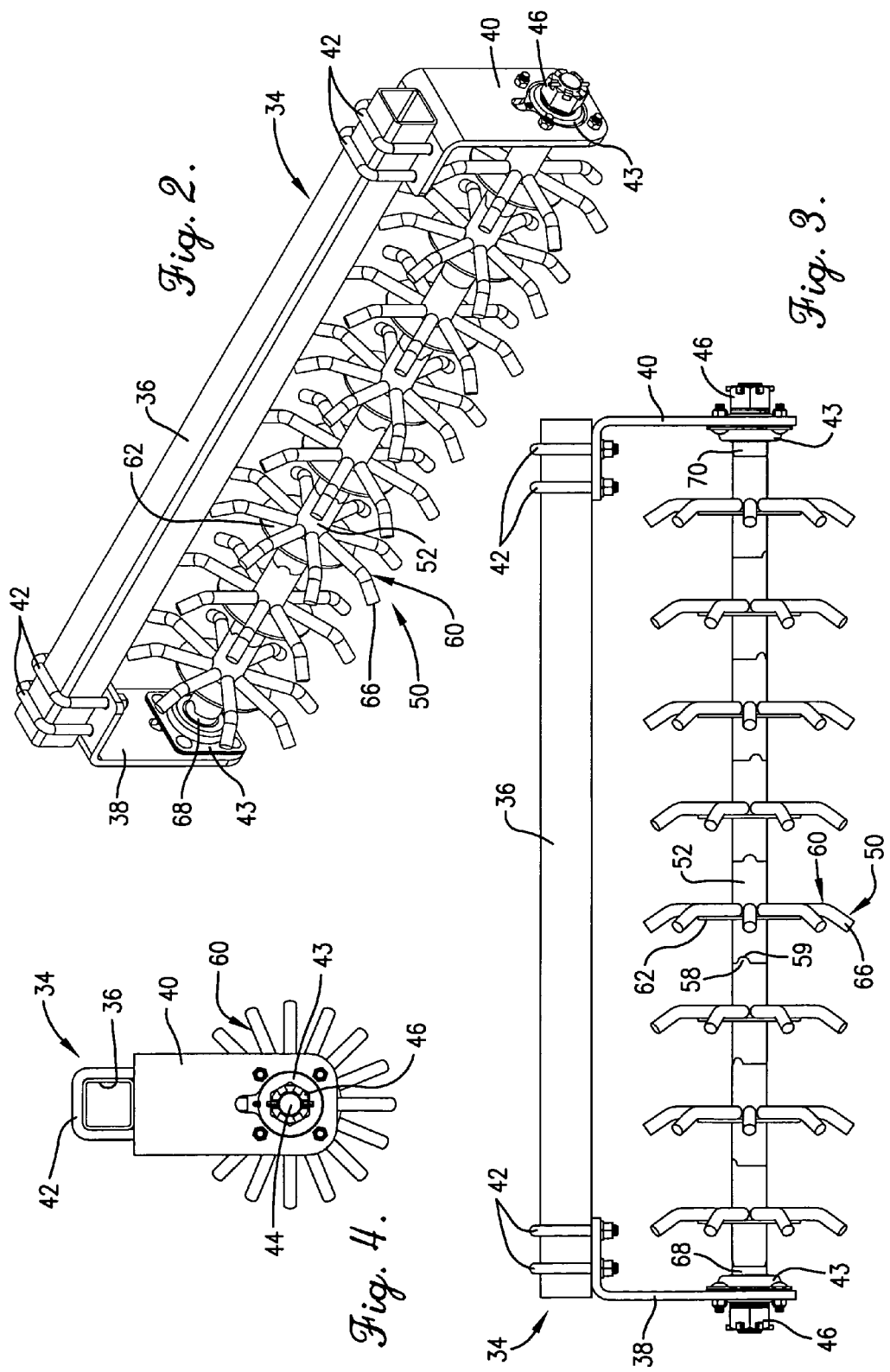

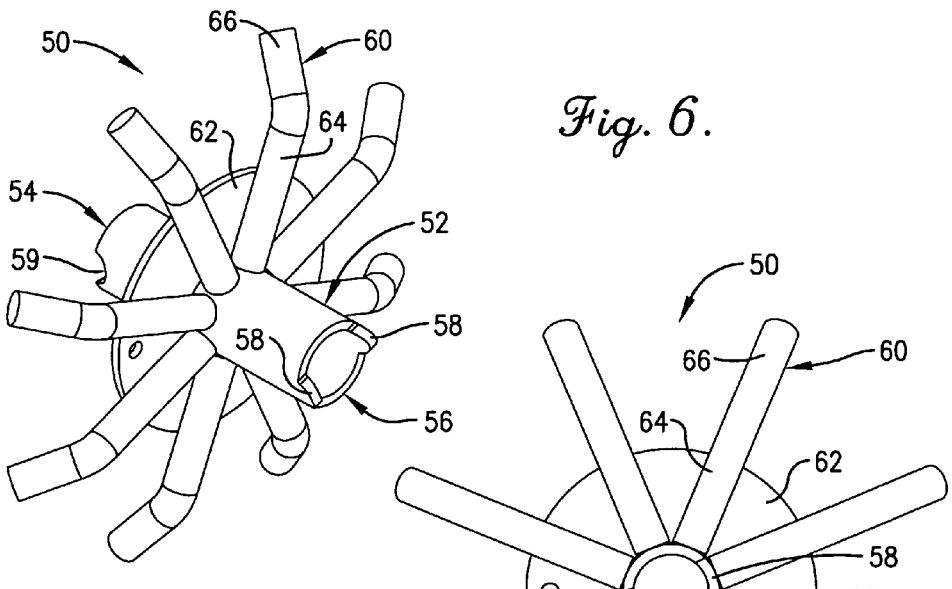
Fig. 6.
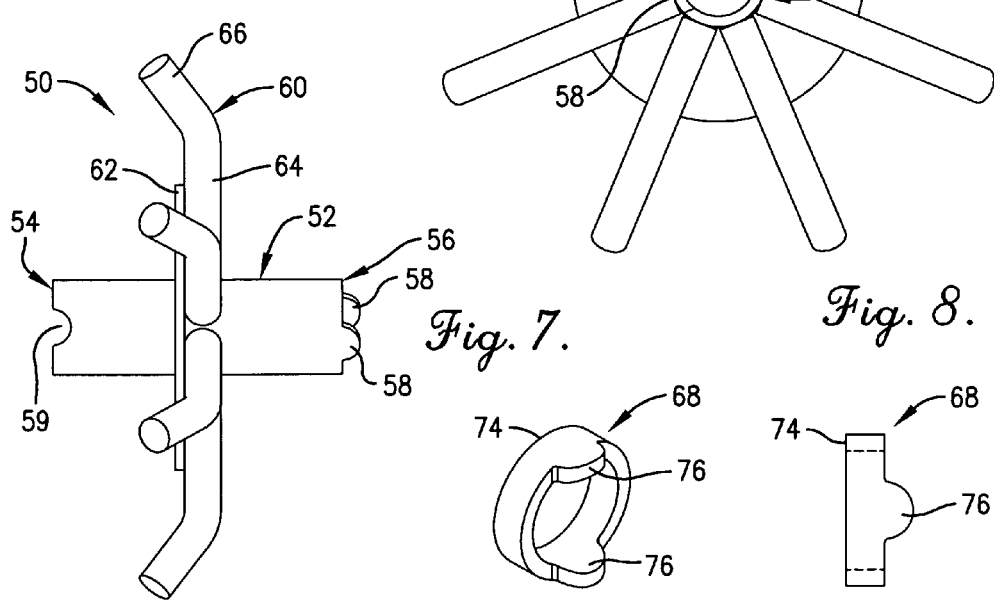
Fig. 7.    Fig. 8.
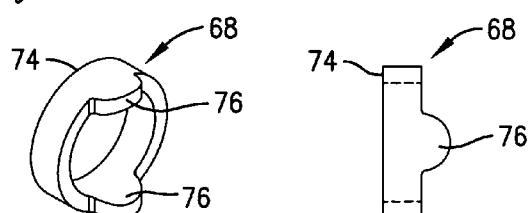
Fig. 9.    Fig. 10.
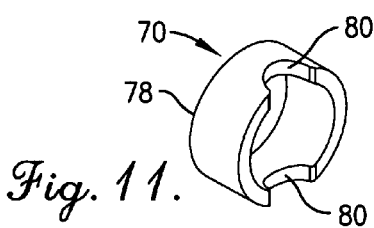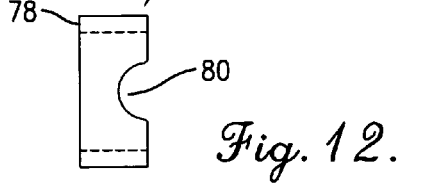
Fig. 11.    Fig. 12.

ROLLING SPIKE HARROW

TECHNICAL FIELD

The present invention relates to tillage equipment and, more particularly, to improvements in the spike wheels of a rolling spike harrow.

BACKGROUND AND SUMMARY

Harrows of various types have been known in the art for many years. Typically, such harrows utilize gangs of concavo-convex discs or spike wheels to loosen and finish the seed bed soil. Disc gangs advantageously lift and move soil to the side to some extent as they penetrate and loosen the soil, but discs have the disadvantage of tending to create a compaction layer that is difficult for plant roots to penetrate.

The present invention provides a spike wheel that avoids the creation of a compaction layer yet still has the ability to dislodge and move soil laterally to a certain extent as it loosens and lifts the soil while crushing clods and partially burying residue. In a preferred embodiment, the spikes of each spike wheel radiate outwardly from a hub of the wheel and are provided with outermost tips that are slightly inturned so as to yield a generally concavo/convex overall configuration for the wheel. Thus, although the spikes penetrate, loosen and dislodge the soil without creating a layer of hardpan, their slight concavity gives them the ability to lift and move soil laterally to a certain extent as the wheels are arranged in obliquely disposed gangs and drawn across the surface of the ground.

To facilitate manufacture, installation and replacement of the spike wheels, all wheels of each gang are identical and are mounted on a common shaft having a circular cross section. In order to maintain adjacent wheels slightly rotatively offset from one another so that corresponding spikes of adjacent wheels to do not engage the ground simultaneously, adjacent spike wheels in the gang are provided with mutually interengaging structure that holds the adjacent wheels slightly indexed relative to one another. In a preferred embodiment, such structure takes the form of one or more projections on the hub of one wheel and one or more corresponding receiving notches on the hub of the adjacent wheel. Each wheel is thus provided with one or more projections at one end of its hub and one or more notches at the opposite end of the hub, such notches being angularly offset from the projections.

BRIEF DESCRIPTION OF THE DRAWINGS

FIG. 2 is an enlarged, isometric view of a gang of spike wheels forming a part of such machine;

FIG. 3 is a front elevational view of the gang;

FIG. 4 is an end elevational view of the gang;

FIG. 6 is an isometric view of one spike wheel of the gang;

FIG. 7 is a front elevational view of the spike wheel;

FIG. 8 is an end elevational view of the spike wheel;

FIG. 9 is an isometric view of a spacer collar used at one end of a gang of spike wheels;

FIG. 10 is a front elevational view of the collar of FIG. 9;

FIG. 11 is an isometric view of another spacer collar utilized at the opposite end of the gang of spike wheels; and FIG. 12 is a front elevational view of the collar of FIG. 11.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
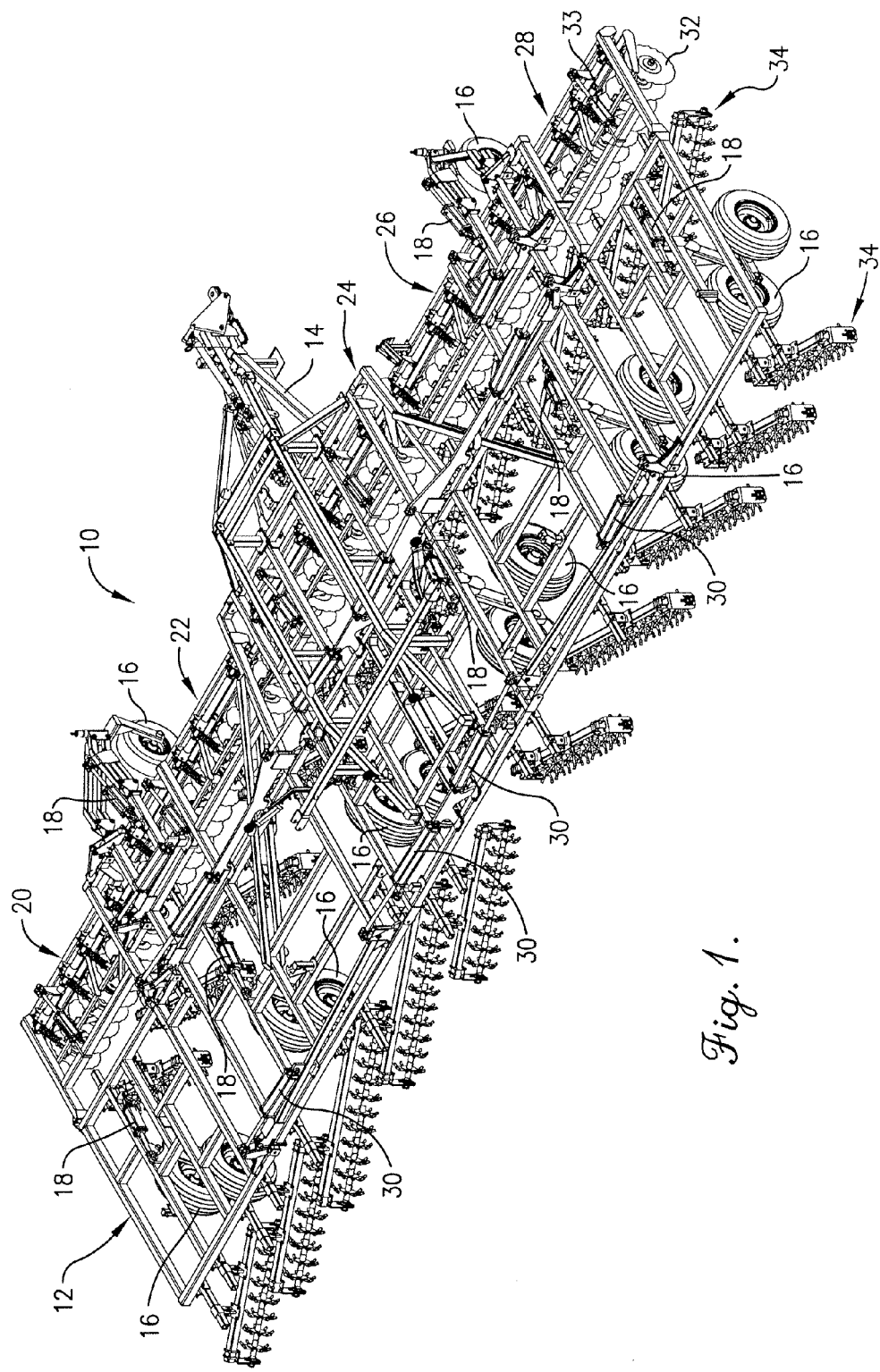
FIG. 1 is a top right rear isometric view of a machine constructed in accordance with the principles of the present invention.

The machine 10 illustrated in FIG. 1 is but one of many different types of machines with which the present invention may be utilized. In the particular illustrated embodiment, machine 10 comprises a mobile frame 12 that is drawn by a tongue 14 which may be attached to a towing vehicle (not shown). Frame 12 is supported by a number of ground wheels 16, each of which is controlled by a hydraulic cylinder 18 for raising and lowering frame 12 relative to wheels 16 for depth control and transport purposes. In the particular illustrated embodiment, frame 12 is divided into five individual sections 20, 22, 24, 26 and 28 that are hingedly interconnected to allow flexure of frame 12 sufficient to accommodate changes in ground contour. Numerous hydraulic lift cylinders 30 are provided for use in folding and unfolding frame sections 20-28 between transport and working positions.

In a preferred embodiment, machine 10 includes aligned gangs of low concavity coulters or discs 32 across the front of frame 12. Coulters 32 are particularly beneficial in cutting and slicing residue into manageable pieces as the machine travels through a field having residue from the previous harvest season remaining thereon. Coulters 32 maybe raised and lowered relative to frame 12 through the use of hydraulic cylinders, such as cylinder 33.

In the illustrated embodiment, machine 10 is provided with two ranks or rows of spike wheels. The front row of spike wheels is located immediately behind coulters 32 and ahead of the rear support wheels 16. The second or rear row of spike wheels is located across the rear of frame 12, behind the rear support wheels 16. Each row of spike wheels is comprised of a number of individual gangs 34, the details of which will be discussed below.

Gangs 34 in the front row are arranged at a certain oblique angle relative to the direction of forward travel of machine 10, while gangs 34 in the rear row are arranged at an opposite oblique angle. It will also be noted that gangs on the right side of machine 10 are arranged in oblique angles that are opposite to the oblique angles of the gangs on the left side of the machine. Preferably, each rear gang 34 is disposed in fore-and-aft alignment with a corresponding forward or front gang. As will be seen, spike discs of a front gang tend to move soil outwardly, while spike wheels in a trailing gang tend to move soil back inwardly, thus eliminating ridging and leaving a smooth, firm surface for a seed bed.

Figure 5:
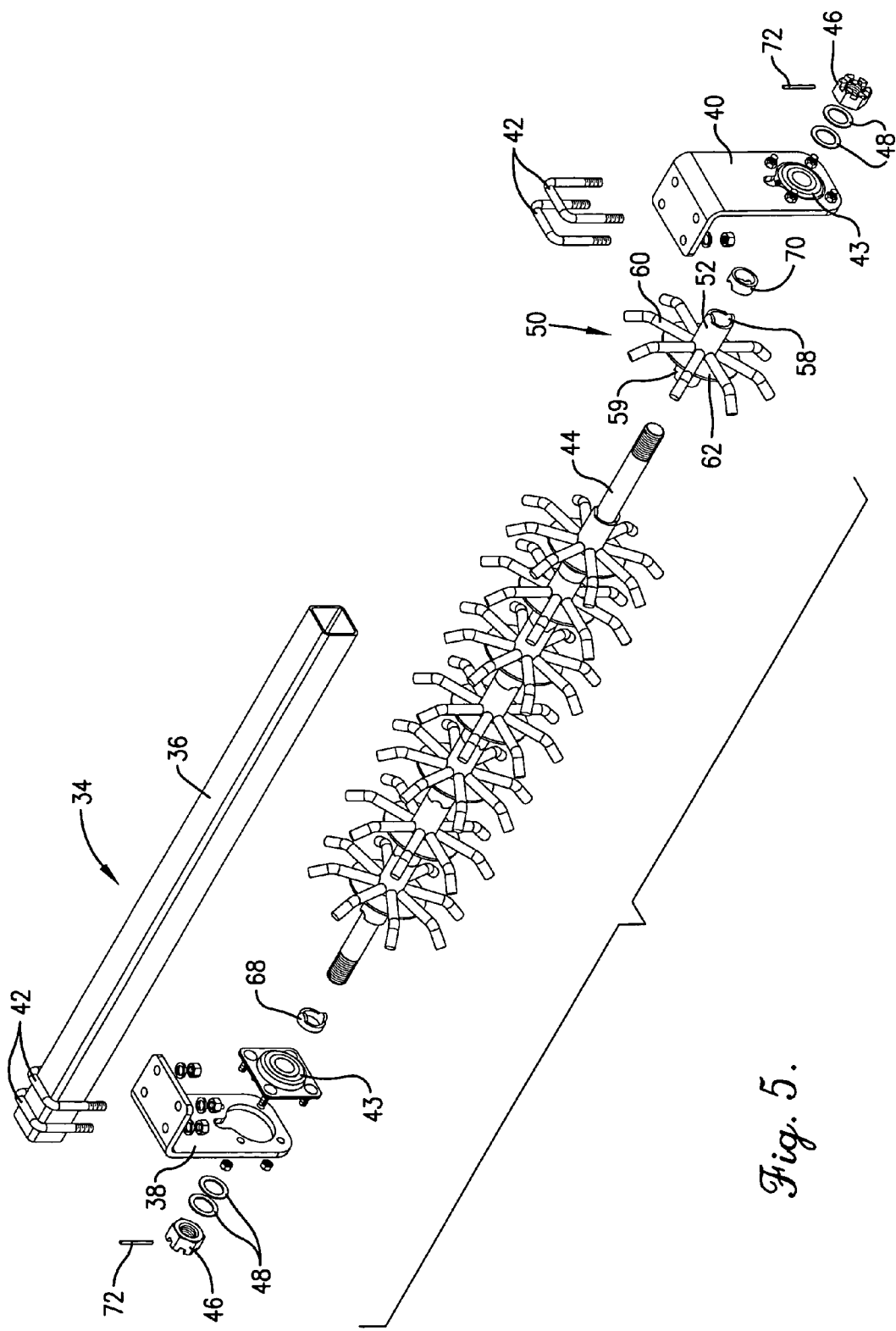
FIG. 5 is an exploded isometric view of the gang illustrating the various components thereof.

With reference to FIGS. 2-11, each gang 34 includes an elongated support member in the form of a rectangular tube 36. A pair of hanger brackets 38 and 40 are clamped to opposite ends of tube 36 by U-bolts 42 so that brackets 38 and 40 project downwardly below tube 36 and oppose one another. Each bracket 38, 40 has a bearing assembly 43 supported at the lower end thereof such that bearing assemblies 43 support and journal a long shaft 44 having a circular cross sectional configuration. Opposite ends of shaft 44 are threaded and project slightly through and beyond bearing assemblies 43 and threadably receive nuts 46 and washers 48 (FIG. 5).

A series of identical spike wheels 50 are carried on shaft 44 in side-by-side relationship for rotation in unison and with shaft 44. Each wheel 50 comprises a cylindrical hub 52 having a pair of opposite ends 54 and 56. End 56 is provided with a pair of diametrically opposed projections 58 having semi-circular outermost edges, while opposite end 54 is provided with a pair of diametrically opposed notches 59 of mating configuration with respect to projections 58. Projections 58 and notches 59 are slightly angularly offset from one another, such offset preferably being approximately 22½°. Projections 58 and notches 60 are slightly angularly offset from one another, such offset preferably being approximately 22½°.

Approximately midway along the length of hub 52, a multiplicity of spikes 60 project outwardly therefrom. In a preferred embodiment, there are eight spikes 60 evenly spaced about hub 52 at 45° intervals. Spikes 60 are welded to hub 52 at their inner ends and are additionally supported by a stiffening disc 62 that is likewise welded to hub 52. Disc 62 abuts one side of spikes 60 and is welded thereto at a number of locations.

Each spike 60 has a constant diameter throughout its entire length. A main shank portion 64 of each spike 60 projects radially outwardly from hub 52 and lies in a plane that is normal to the longitudinal axis of hub 52 and the axis of rotation defined thereby. Each spike 60 is also provided with an inturned tip 66 that is substantially shorter than shank portion 64, thus giving each spike wheel 50 a generally concavo-convex overall configuration. Each wheel 50 thus presents a generally concave side facing plate 62 and a generally convex side facing away from plate 62. The angle of inturn of each tip 66 is approximately 35° relative to the longitudinal axis of shank portion 64.

As illustrated in FIGS. 2, 3 and 5, the projections 58 on one hub 52 are received within the notches 59 of the next adjacent hub 52 when the spike wheels 50 are stacked end-to-end along the shaft 44. The angular offset of the projections 58 and notches 59 of each hub 52 thus cause adjacent spike wheels 50 to be correspondingly angularly offset from one another by the same amount, i.e., preferably approximately 22½°. Thus, the spikes 60 of adjacent wheels 50 are not aligned with one another along the length of shaft 44 but are instead angularly offset by approximately 22½°. Such offset improves the ground penetration by the spikes of adjacent wheels, resulting in better soil disturbance and loosening.

A pair of spacer collars 68 and 70 are provided at opposite ends of the line of spike wheels 50. Collars 68 and 70 are clamped between the respective hub 52 and the inner race of the corresponding bearing 43 so as to take up any looseness in the line of wheels 50 and to secure the wheels 50, collars 68, 70, nuts 46, washers 48 and the inner races of bearing assemblies 43 all into a consolidated unit that is rotatable about the longitudinal axis of shaft 44. The tightness of the unit thus produced is controlled by nuts 46, which may be locked in their secured positions by transverse lock pins 72 which pass through nuts 46 and corresponding holes (not shown) in the threaded portions of shaft 44.

As illustrated particularly in FIGS. 9 and 10, spacer collar 68 is provided with a flat side 74 that abuts the inner race of the corresponding bearing assembly 43. The other side of collar 68 is provided with a pair of diametrically opposed projections 76 that correspond in shape and size to projections 58 on hubs 52. Thus, projections 76 are matingly received within notches 59 in the end 54 of the leftmost spike wheel 50 in the series of wheels as viewed in FIGS. 2, 3 and 5.

Similarly, spacer collar 70 is provided with a flat side 78 that abuts the inner race of the proximal bearing assembly 43. On its opposite side, collar 70 is provided with a pair of diametrically opposed notches 80 that correspond in shape and size to the notches 59 in the hubs 52. Thus, notches 80 in collar 70 matingly receive projections 58 on the end of the hub 52 associated with the rightmost spike wheel 50 as viewed in FIGS. 2, 3 and 5.

OPERATION

Operation and use of the present invention should be apparent from the foregoing description. Accordingly, such operation and use will only be briefly described.

As noted earlier, the gangs 34 of spike wheels 50 are preferably arranged in at least two fore-and-aft spaced ranks or rows as illustrated in FIG. 1. Gangs in the rear row are arranged in fore-and-aft alignment with corresponding gangs in the front row and are disposed obliquely opposite to the front gangs. Furthermore, gangs in each row overlap slightly so that no untilled strips of soil are left within each swath taken by the implement. Preferably, the spike wheels 50 in the front row are arranged to move soil outwardly, while the spike wheels of the rear row are arranged to move the soil back in toward the center of the machine. This leaves a smooth firm seed bed that is ready for planting.

It will be appreciated that as the machine 10 moves forwardly with spike wheels 50 engaging the ground, ground contact causes wheels 50 to rotate, the wheels rotating downwardly at their forward sides. The individual spikes 60 penetrate, loosen and lift the soil, while also providing a certain amount of lateral movement thereto because of the inclined tips 66. Thus, in many respects the spike wheels 50 perform a tilling action somewhat akin to disc blades, but without the creation of a soil compaction layer which often accompanies disc blades. Furthermore, the angular or rotative offset of adjacent wheels in each gang assures better soil penetration for improved overall performance.

It will also be appreciated that manufacture and assembly of each gang 34 is simplified by virtue of the identical nature of the various wheels in each gang. Moreover, the wheels are virtually self-indexing during initial assembly and any subsequent reassembly because of maintenance or repair, as projections 58 and notches 59 readily slip together to provide positive interengagement. In this respect, while each hub 52 has been illustrated and described as having a pair of projections 58 and a pair of notches 59, it is within the principles of the present invention to provide only a single projection 58 and a single notch 59 at each end of the hub. Additional projections and notches could also be provided, but that might make indexing of the wheels during initial assembly and reassembly somewhat more confusing.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A tillage tool comprising:
   a shaft supported for rotation about its longitudinal axis; and a series of coaxial spike wheels disposed along the length of said shaft for rotation therewith in unison about the longitudinal axis of the shaft in engagement with the ground, each of said spike wheels including as a part thereof a hub received on said shaft and a plurality of spikes projecting outwardly from said hub at spaced locations around the hub such that the hub and spikes are rotated together as a unit by the ground during advancement of the tool with the wheels in engagement with the ground, each hub having a pair of opposite ends abutting an end of the hub of the next adjacent spike wheel, the ends of adjacent hubs being provided with interengaging locating structure disposed to rotatively index adjacent spike wheels by a certain amount relative to one another, said structure including a notch on one hub and a projection on the adjacent hub matingly received within said notch, each hub having a notch at one end and a projection at the other end, said notch and said projection of each hub being circularly offset from one another by said certain amount whereby to correspondingly maintain adjacent wheels interlocked and circularly offset from one another during their rotation as a unit with the shaft and with one another during ground engagement.

2. A tillage tool as claimed in claim 1,
said certain amount comprising approximately 22½°.

3. A tillage tool as claimed in claim 1, further comprising a pair of collars encircling said shaft at opposite ends of the series of spike wheels, one of said collars being flat at an outboard end and having a projection at an inboard end that mates with the notch in the adjacent spike wheel, the other of said collars being flat at an outboard end and having a notch at an inboard end that mates with the projection in the adjacent spike wheel.

4. A tillage tool as claimed in claim 1,
said spikes of each wheel being spaced about the hub at approximate 45° intervals.

5. A tillage tool as claimed in claim 2,
said spikes of each wheel being spaced about the hub at approximate 45° intervals.

6. A tillage tool as claimed in claim 1,
said spikes of each wheel having inturned outermost tips to render the wheel generally concavo-convex in overall configuration.

7. A tillage tool as claimed in claim 6,
each of said tips being inturned at an approximate 35° angle relative to a main shank portion of the spike.

* * * * *